(12) United States Patent
Yamamoto

(10) Patent No.: US 11,923,549 B2
(45) Date of Patent: Mar. 5, 2024

(54) FUEL CELL AND MANUFACTURING METHOD OF MEMBRANE ELECTRODE ASSEMBLY PLATE

(71) Applicant: TOYOTA JIDOSHA KABUSHIKI KAISHA, Toyota (JP)

(72) Inventor: Atsushi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/457,666

(22) Filed: Dec. 5, 2021

(65) Prior Publication Data

US 2022/0209252 A1    Jun. 30, 2022

(30) Foreign Application Priority Data

Dec. 25, 2020  (JP) ................. 2020-216978

(51) Int. Cl.
| | |
|---|---|
| H01M 4/90 | (2006.01) |
| H01M 4/86 | (2006.01) |
| H01M 4/88 | (2006.01) |
| H01M 8/0273 | (2016.01) |
| H01M 8/1004 | (2016.01) |

(52) U.S. Cl.
CPC ....... *H01M 4/9058* (2013.01); *H01M 4/8605* (2013.01); *H01M 4/8657* (2013.01); *H01M 4/8803* (2013.01); *H01M 4/8807* (2013.01); *H01M 4/8817* (2013.01); *H01M 8/0273* (2013.01); *H01M 8/1004* (2013.01)

(58) Field of Classification Search
CPC .................................................. H01M 8/0273
See application file for complete search history.

(56) References Cited

U.S. PATENT DOCUMENTS

| | | | |
|---|---|---|---|
| 2009/0023028 A1 | 1/2009 | Sekine | |
| 2016/0260989 A1 | 9/2016 | Ikeda et al. | |
| 2018/0323441 A1* | 11/2018 | Nakanishi | H01M 4/8657 |
| 2020/0280074 A1* | 9/2020 | Kim | B01J 23/10 |

FOREIGN PATENT DOCUMENTS

| | | | |
|---|---|---|---|
| JP | 2006294293 A | 10/2006 | |
| JP | 2016162649 A | 9/2016 | |
| JP | 2017188347 A | 10/2017 | |
| JP | 2019185923 A | 10/2019 | |
| JP | 2020061265 A | 4/2020 | |
| JP | 2021-099953 | * 7/2021 | |

\* cited by examiner

*Primary Examiner* — Jonathan Crepeau

(74) *Attorney, Agent, or Firm* — Hunton Andrews Kurth LLP

(57) ABSTRACT

An adhesive layer is placed in a region outside an outer peripheral edge part of a second catalyst layer, on a second surface of an electrolyte membrane. A support frame is placed via the adhesive layer such that the second catalyst layer and a second gas diffusion layer are placed inside an opening of the support frame. A specific region as a region between the outer peripheral edge part of the second catalyst layer and an inner peripheral edge part of the opening of the support frame is present. A predetermined material is placed inside a recessed portion present on a surface of the adhesive layer inside the specific region, the predetermined material containing at least one of a first substance having an action of decomposing hydrogen peroxide and a second substance having an action of decomposing hydroxyl radicals.

5 Claims, 8 Drawing Sheets

G1
WITH PLACEMENT OF
CATALYST INK

G2
WITHOUT PLACEMENT OF
CATALYST INK

FUEL CELL AND MANUFACTURING METHOD OF MEMBRANE ELECTRODE ASSEMBLY PLATE

CROSS-REFERENCE TO RELATED APPLICATION

This application claims priority to Japanese Patent Application No. 2020-216978 filed on Dec. 25, 2020, incorporated herein by reference in its entirety.

BACKGROUND

1. Technical Field

The technology described in the present specification relates to a fuel cell and a manufacturing method for manufacturing a membrane electrode assembly plate.

2. Description of Related Art

There has been known a technology in which a frame member is fixed to a peripheral edge part of a first surface of a membrane electrode assembly (MEA) such that the frame member is attached to an adhesive applied in a frame shape to the peripheral edge part of the first surface of the MEA, and the adhesive is hardened. Japanese Unexamined Patent Application Publication No. 2017-188347 (JP 2017-188347 A) describes a technology to remove, by ultrasonic waves, air bubbles included in the applied adhesive.

SUMMARY

It is possible to reduce the air bubbles in the adhesive by ultrasonic waves or the like, but it is difficult to completely eliminate the air bubbles. When the air bubbles are present in the adhesive, a recessed portion penetrating through an adhesive layer may be formed. When oxygen in air to be supplied to a cathode side crosses over to an anode side due to the recessed portion, oxygenated water is generated on the anode side. In a case where such crossing-over occurs in an outer peripheral region of a membrane electrode assembly, the outer peripheral region being a region where no catalyst layer is present, generated hydrogen peroxide is not decomposed in the catalyst layer. As a result, due to hydroxyl radicals generated from oxygenated water, deterioration of an electrolyte membrane is accelerated.

A fuel cell described in the present specification includes an electrolyte membrane, first and second catalyst layers, first and second gas diffusion layers, an adhesive layer; and a support frame. The first catalyst layer is placed on a first surface of the electrolyte membrane. The first gas diffusion layer is placed on the first catalyst layer. The second catalyst layer smaller than the electrolyte membrane is placed on a second surface of the electrolyte membrane such that the second catalyst layer is placed inwardly from an outer periphery of the electrolyte membrane. The second gas diffusion layer smaller than the electrolyte membrane is placed on the second catalyst layer such that the second gas diffusion layer is placed inwardly from the outer periphery of the electrolyte membrane. The adhesive layer is placed in a region outside an outer peripheral edge part of the second catalyst layer, on the second surface of the electrolyte membrane. The support frame includes an opening larger than the second catalyst layer and the second gas diffusion layer. The support frame is disposed on the second surface of the electrolyte membrane via the adhesive layer such that the second catalyst layer and the second gas diffusion layer are placed inside the opening. A specific region as a region between the outer peripheral edge part of the second catalyst layer and an inner peripheral edge part of the opening of the support frame is present. A predetermined material is placed inside a recessed portion present on a surface of the adhesive layer within the specific region, the predetermined material containing at least one of a first substance having an action of decomposing hydrogen peroxide and a second substance having an action of decomposing hydroxyl radicals.

The specific region is a region where the second catalyst layer is not present. When the predetermined material is placed inside the recessed portion present on the surface of the adhesive layer within the specific region, it is possible to reduce the crossover amount of oxygen. Further, generated hydrogen peroxide or hydroxyl radicals can be decomposed by the first substance or the second substance contained in the predetermined material. It is possible to restrain deterioration of the electrolyte membrane.

The first substance may be platinum. Generated hydrogen peroxide can be decomposed by platinum.

The second substance may be cerium or silver. Generated hydroxyl radicals can be decomposed by cerium or silver.

The second catalyst layer may contain the first substance. The predetermined material may be the same as a material forming the second catalyst layer. The material forming the second catalyst layer can be also used as the predetermined material. This makes it possible to reduce a manufacturing cost.

The fuel cell may further include a porous layer placed between the second catalyst layer and the second gas diffusion layer, the porous layer containing water-repellent resin and the second substance. The predetermined material may be the same as a material forming the porous layer. The material forming the porous layer can be also used as the predetermined material. This makes it possible to reduce a manufacturing cost.

The technology described in the present specification is embodied in a manufacturing method for manufacturing a membrane electrode assembly plate. The manufacturing method includes a membrane electrode assembly configured such that an electrocatalyst layer is formed on either side of an electrolyte membrane, and a support frame having a frame shape with an opening and fixed to an outer periphery of the membrane electrode assembly via an adhesive layer. The manufacturing method includes a step of forming the adhesive layer into a frame shape in an outer peripheral part of a first surface of the membrane electrode assembly. The manufacturing method includes a step of providing the support frame on a surface of the adhesive layer in a contact manner. The manufacturing method includes a step of hardening the adhesive layer in a state where the support frame makes contact with the adhesive layer. The manufacturing method includes a first placing step of placing a predetermined material inside a recessed portion present on the surface of the adhesive layer present inwardly from an inner peripheral edge part of the opening of the support frame, the predetermined material containing at least one of a first substance having an action of decomposing hydrogen peroxide and a second substance having an action of decomposing hydroxyl radicals. When the predetermined material is placed inside the recessed portion, it is possible to reduce the crossover amount of oxygen. Further, generated hydrogen peroxide or hydroxyl radicals can be decomposed by the first substance or the second substance contained in the predetermined material.

The first placing step may include a step of applying the predetermined material in a liquid form to at least one part on the surface of the adhesive layer present inwardly from the inner peripheral edge part of the opening. The first placing step may include a step of moving a member while the member is pressed against the surface of the adhesive layer to which the predetermined material is applied. This makes it possible to place the predetermined material inside the recessed portion.

The manufacturing method may further include a second placing step of placing a gas diffusion layer on the first surface of the membrane electrode assembly, the second placing step being performed after the first placing step.

The manufacturing method may further include an inspection step of inspecting whether or not a recessed portion is present on the surface of the adhesive layer present inwardly from the inner peripheral edge part of the opening, the inspection step being performed before the first placing step.

The first placing step may be performed in accordance with an inspection result in the inspection step. This makes it possible to place the predetermined material inside the recessed portion appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment 1

Configuration of MEGA Sheet 1

Figure 1:
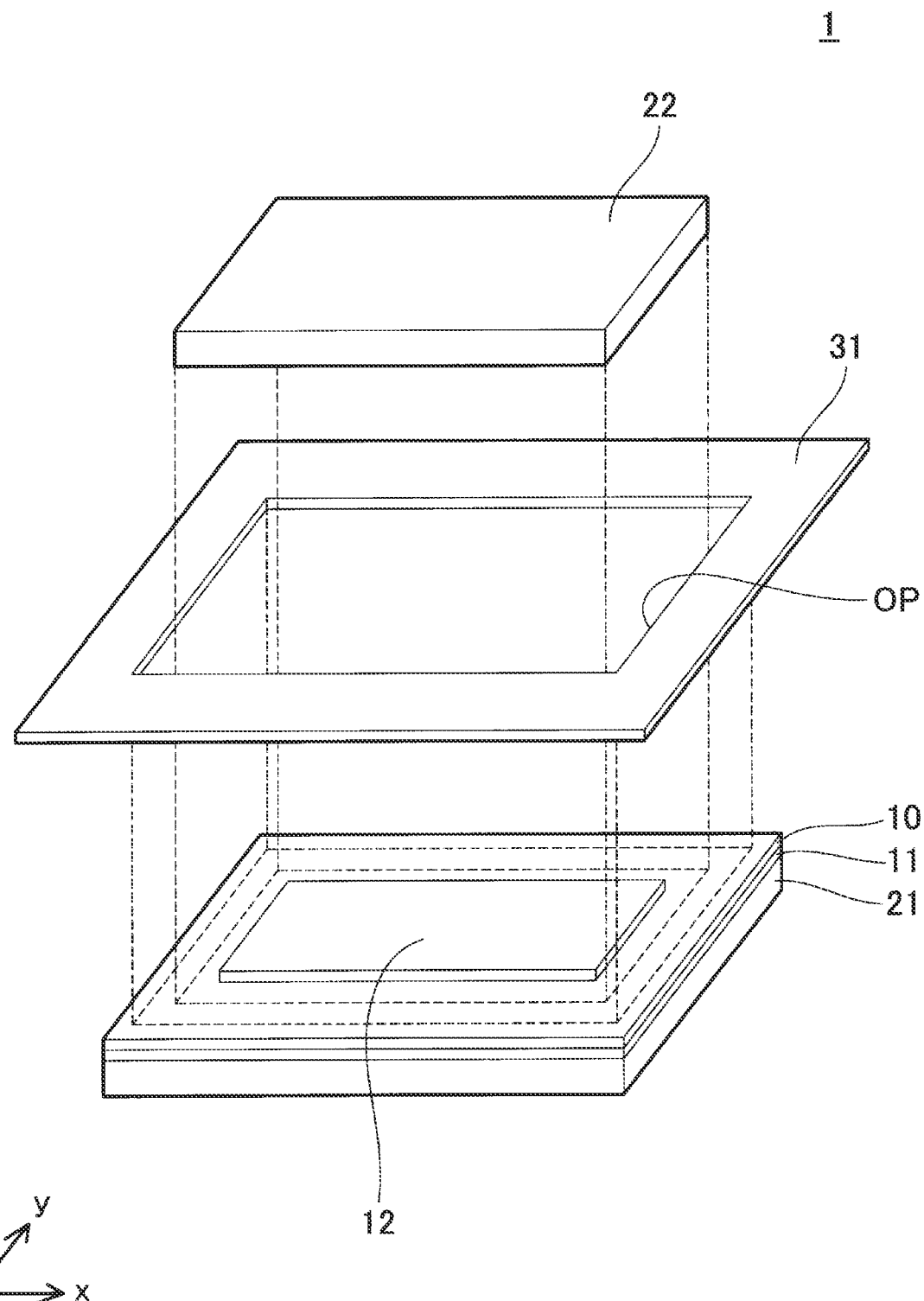
FIG. 1 is an exploded perspective view of a MEGA sheet 1.
Figure 2:
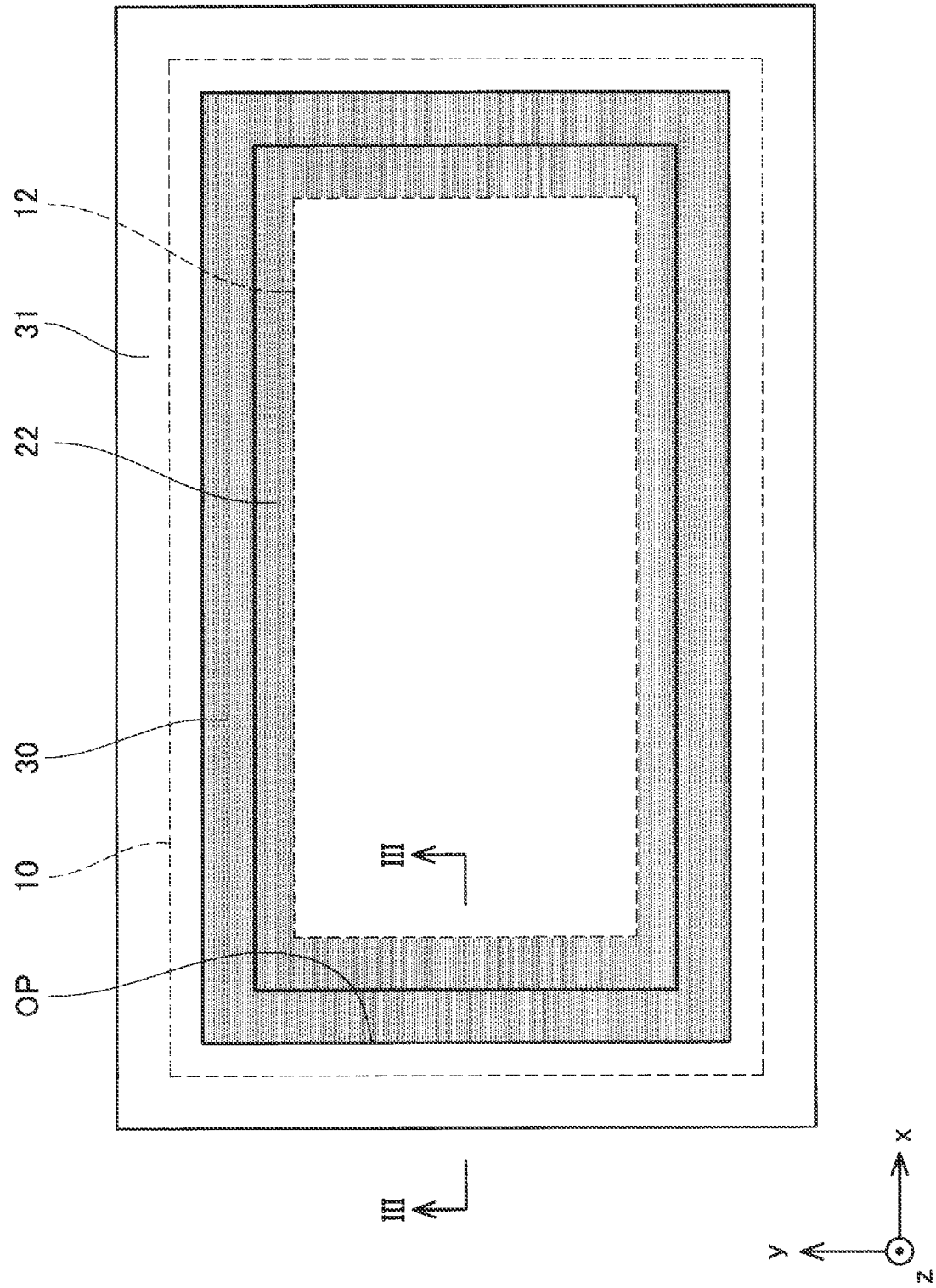
FIG. 2 is a top view of the MEGA sheet 1.
Figure 3:
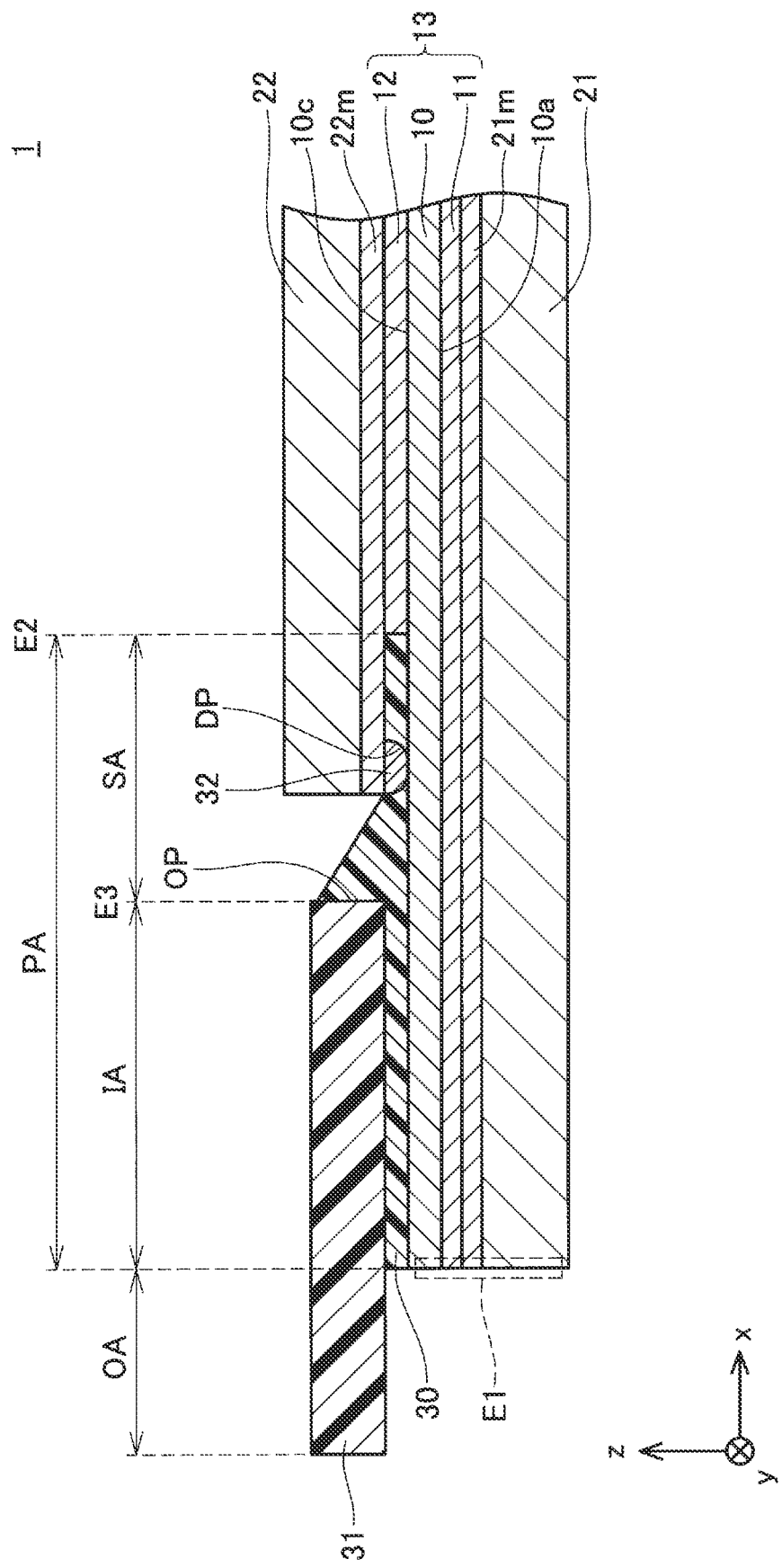
FIG. 3 is a partial sectional view taken along a line in FIG. 2.

FIG. 1 is an exploded perspective view of a membrane electrode gas diffusion layer assembly (MEGA) sheet 1. FIG. 2 is a top view of the MEGA sheet 1. FIG. 3 is a partial sectional view taken along a line III-III in FIG. 2. The MEGA sheet 1 is a power generator sheet for a fuel cell. The MEGA sheet 1 constitutes a fuel cell such that the MEGA sheet 1 is sandwiched between an anode-side separator and a cathode-side separator (not illustrated). The MEGA sheet 1 includes an electrolyte membrane 10, an anode catalyst layer 11, a cathode catalyst layer 12, an anode MPL 21m, a cathode MPL 22m, an anode-gas diffusion layer 21, a cathode-gas diffusion layer 22, an adhesive layer 30, and a support frame 31. Note that "MPL" is an abbreviation of a micro porous layer.

The electrolyte membrane 10 is a proton conducting ion-exchange membrane made of a solid polymeric material. The anode catalyst layer 11 and the cathode catalyst layer 12 are porous layers configured such that carbon particles carrying catalyst are connected to each other via resin. In the present embodiment, the catalyst is platinum having an action of decomposing hydrogen peroxide. The anode catalyst layer 11 and the cathode catalyst layer 12 are formed such that a catalyst ink is applied to a surface 10a on an anode side of the electrolyte membrane 10 and a surface 10c on a cathode side thereof and then dried. The catalyst ink is liquid containing catalyst-carrying carbon, electrolyte resin, and a dispersion medium. The electrolyte membrane 10, the anode catalyst layer 11, and the cathode catalyst layer 12 have a rectangular shape. The electrolyte membrane 10, the anode catalyst layer 11, and the cathode catalyst layer 12 constitute a rectangular membrane electrode assembly (MEA) 13.

The anode MPL 21m and the cathode MPL 22m are thin films containing water-repellent resin (e.g., polytetrafluoroethylene (PTFE)), a conductive material (e.g., carbon black), and a substance (e.g., cerium oxide) having a radical decomposition action. The anode MPL 21m has a function to circulate hydrogen gas ($H_2$), a function to keep more moisture ($H_2O$) in the electrolyte membrane 10, a function to efficiently discharge excessive moisture in the MEA 13, and so on. The cathode MPL 22m has a function to efficiently supply air to the cathode catalyst layer 12, and so on. The anode MPL 21m and the cathode MPL 22m are formed such that liquid MPL paste is applied to respective surfaces of the anode-gas diffusion layer 21 and the cathode-gas diffusion layer 22 and burnt.

The anode-gas diffusion layer 21 and the cathode-gas diffusion layer 22 are conductive members having gas permeability. Examples of the conductive members are a carbon porous body (e.g., carbon paper, carbon cloth, and the like), a metal porous body (e.g., a metal mesh, a foam metal, and the like), and so on. The anode-gas diffusion layer 21 and the cathode-gas diffusion layer 22 have a rectangular shape.

The anode catalyst layer 11 and the anode-gas diffusion layer 21 have a magnitude equivalent to the magnitude of the electrolyte membrane 10. The cathode catalyst layer 12 and the cathode-gas diffusion layer 22 are smaller than the electrolyte membrane 10. Further, the cathode catalyst layer 12 is smaller than the cathode-gas diffusion layer 22.

The adhesive layer 30 is a layer made of an applied adhesive. Examples of the adhesive include an adhesive containing organic solvent and having ultra-violet hardenability. The support frame 31 is a member configured to support the electrolyte membrane 10, the anode catalyst layer 11, the cathode catalyst layer 12, the anode MPL 21m, the cathode MPL 22m, the anode-gas diffusion layer 21, and the cathode-gas diffusion layer 22. The support frame 31 has a frame shape having an opening OP. The opening OP is larger than the cathode catalyst layer 12 and the cathode-gas diffusion layer 22. The support frame 31 has a three-layer sheet structure in which an adhesive layer made of thermoplastic resin is placed on either side of a frame layer made of thermosetting resin.

As illustrated in FIG. 3, the anode catalyst layer 11 is placed on a surface 10a on an anode side (a negative z-direction side) of the electrolyte membrane 10. The anode-gas diffusion layer 21 is placed on the anode catalyst layer 11. Respective outer peripheral edge parts of the electrolyte membrane 10, the anode catalyst layer 11, and the anode-gas diffusion layer 21 overlap each other in an edge portion E1.

The cathode catalyst layer 12 is placed on a surface 10c on a cathode side (a positive z-direction side) of the electrolyte membrane 10 such that the cathode catalyst layer 12 is placed inwardly from the outer periphery of the electrolyte membrane 10. A frame-shaped outer peripheral region PA is formed on the surface 10c of the electrolyte membrane 10. No cathode catalyst layer 12 is formed in the outer peripheral region PA. The adhesive layer 30 is placed on the surface 10c inside the outer peripheral region PA. The cathode-gas diffusion layer 22 is placed on the cathode catalyst layer 12 such that the cathode-gas diffusion layer 22 is placed inwardly from the outer periphery of the electrolyte membrane 10. The cathode catalyst layer 12 is placed inwardly from the outer periphery of the cathode-gas diffusion layer 22.

As illustrated in FIG. 3, the frame-shaped support frame 31 has an inner peripheral region IA and an outer peripheral region OA. The inner peripheral region IA is bonded to the surface 10c on the cathode side of the electrolyte membrane 10 via the adhesive layer 30. The outer peripheral region OA projects from the outer periphery of the electrolyte membrane 10 and forms a flange.

A specific region SA is present between an outer peripheral edge part E2 of the cathode catalyst layer 12 and an inner peripheral edge part E3 of the opening OP of the support frame 31. In other words, the specific region SA is a region where the cathode catalyst layer 12 and the support frame 31 are not present, within a region where the adhesive layer 30 is present. In FIG. 2, the specific region SA is illustrated in gray for easiness to understand.

A recessed portion DP is present on the surface of the adhesive layer 30 inside the specific region SA. As will be described later, the recessed portion DP is a defect formed such that air bubbles inside the adhesive layer 30 gather. The recessed portion DP reaches the surface of the electrolyte membrane 10. That is, the recessed portion DP penetrates through the adhesive layer 30. A catalyst ink 32 is placed inside the recessed portion DP. As described above, the catalyst ink 32 is a material used to form the cathode catalyst layer 12. The catalyst ink 32 contains platinum catalyst. Since the catalyst ink 32 is also used as a material to fill the recessed portion DP, it is not necessary to separately prepare a special material to fill the recessed portion DP. Since a material cost can be restrained, it is possible to reduce the manufacturing cost of the MEGA sheet 1.

Manufacturing Method of MEGA Sheet 1

Figure 4:
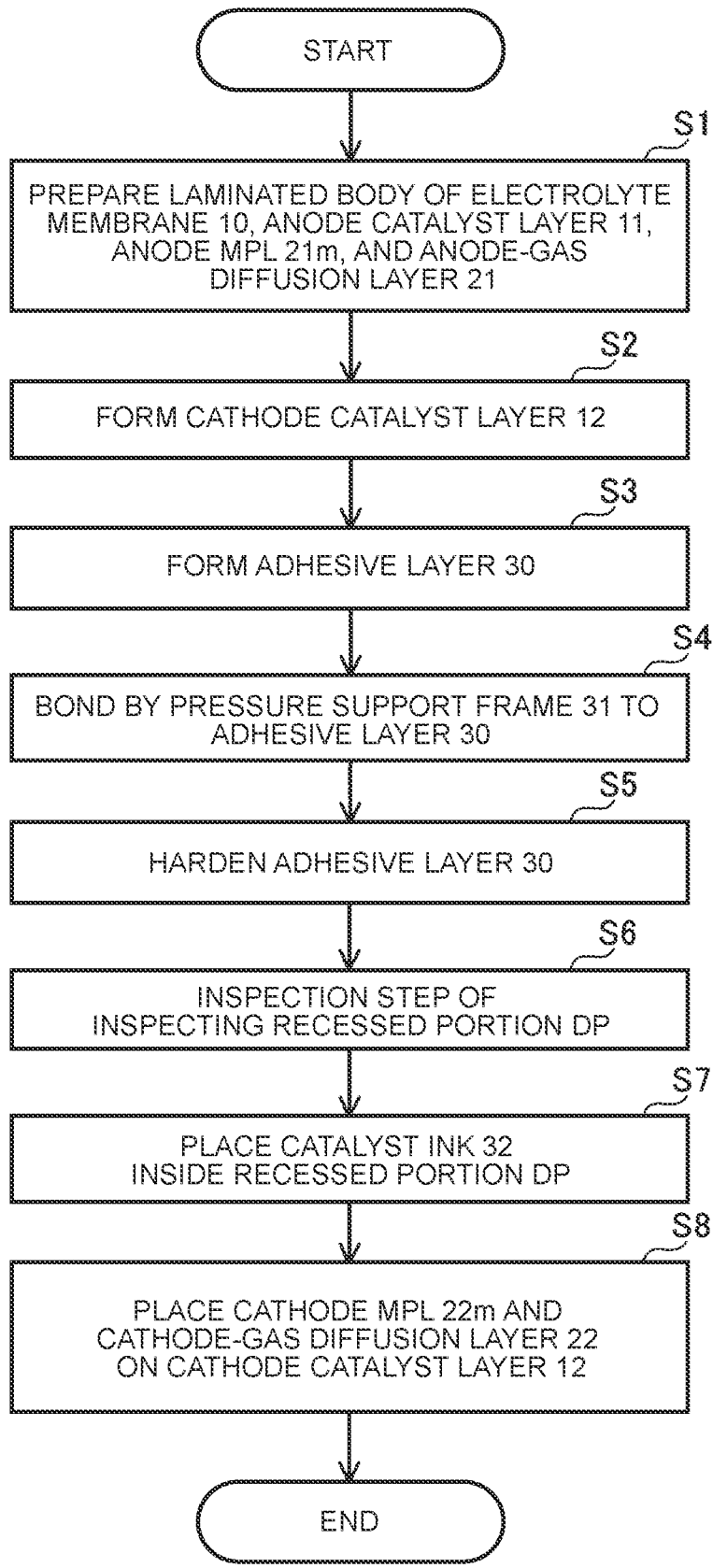
FIG. 4 is a flow diagram to describe a manufacturing method of the MEGA sheet 1.
Figure 5:
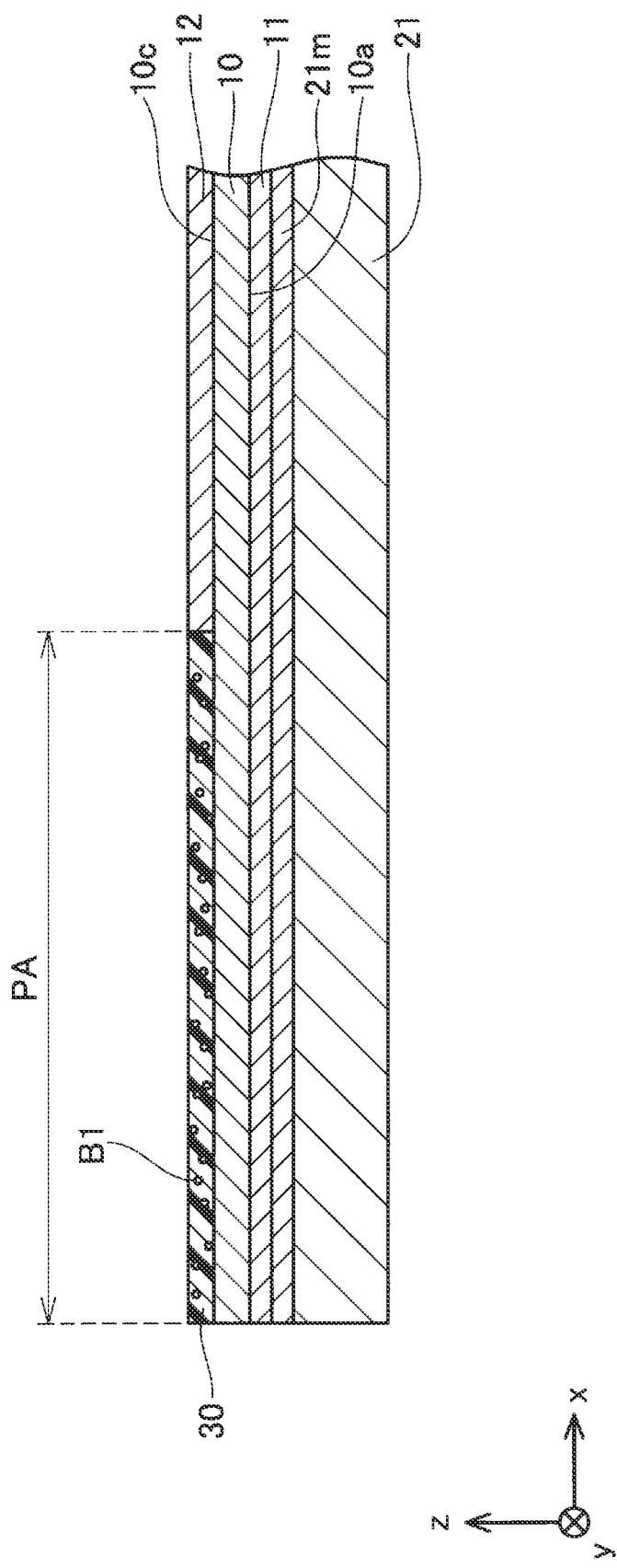
FIG. 5 is a partial sectional view to describe the manufacturing method of the MEGA sheet 1.
Figure 6:
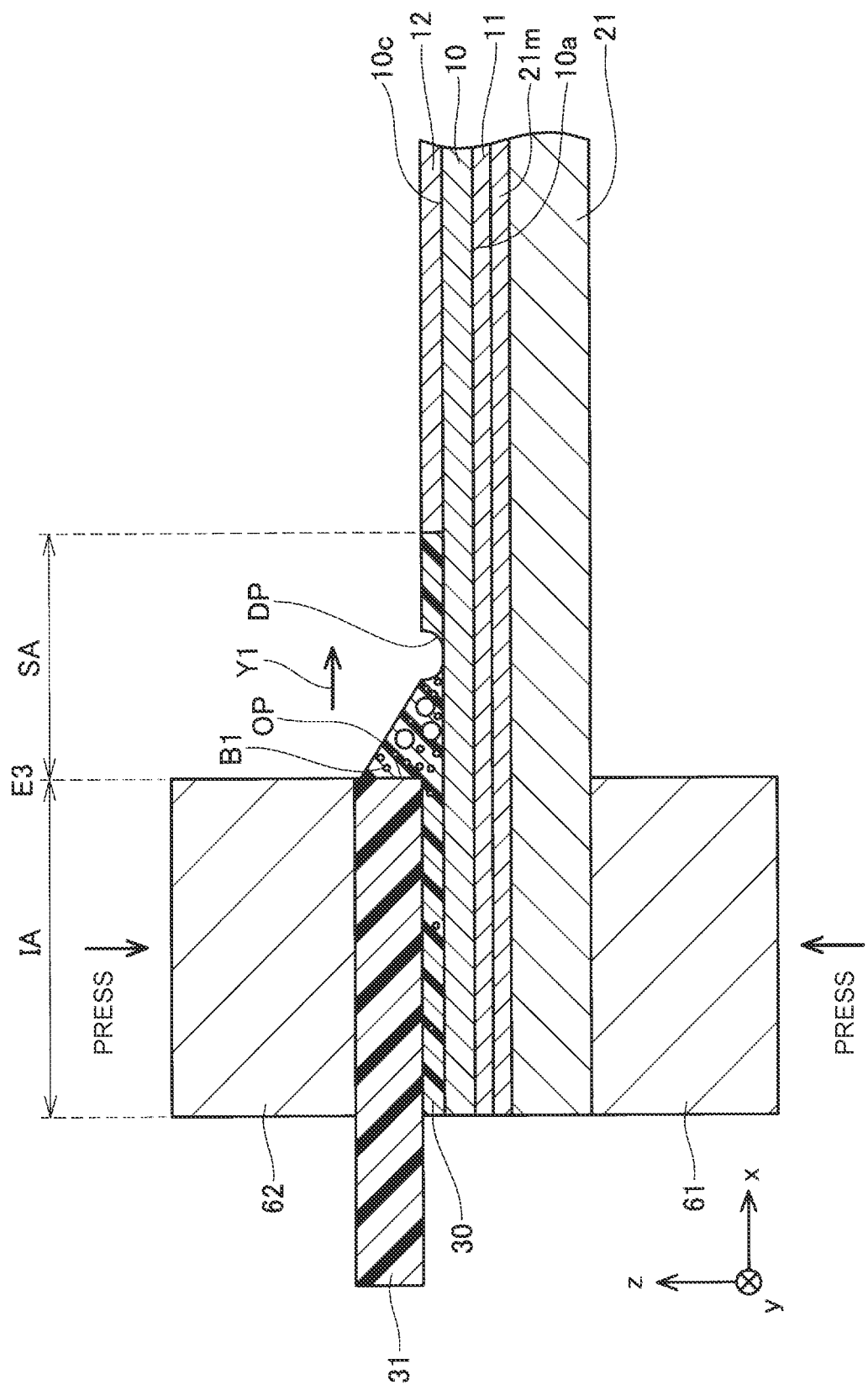
FIG. 6 is a partial sectional view to describe the manufacturing method of the MEGA sheet 1.

With reference to the procedure of FIG. 4 and the sectional views of FIGS. 5 to 6, the following describes a manufacturing method of the MEGA sheet 1. In step S1, a member in which the anode catalyst layer 11, the anode MPL 21m, and the anode-gas diffusion layer 21 are sequentially laminated on the surface 10a on the anode side of the electrolyte membrane 10 is prepared. These layers may be bonded by pressure to each other.

In step S2, in a region present inwardly from the outer peripheral region PA, a catalyst ink is applied onto the surface 10c on the cathode side of the electrolyte membrane 10. By drying the catalyst ink, the cathode catalyst layer 12 is formed (see FIG. 5).

In step S3, an adhesive is applied onto the surface 10c within the outer peripheral region PA. Hereby, the adhesive layer 30 is formed (see FIG. 5). When air is caught in the adhesive at the time of application of the adhesive, a plurality of air bubbles B1 is generated inside the adhesive layer 30. In FIG. 5, the air bubbles B1 are indicated by white circles.

Figure 8:
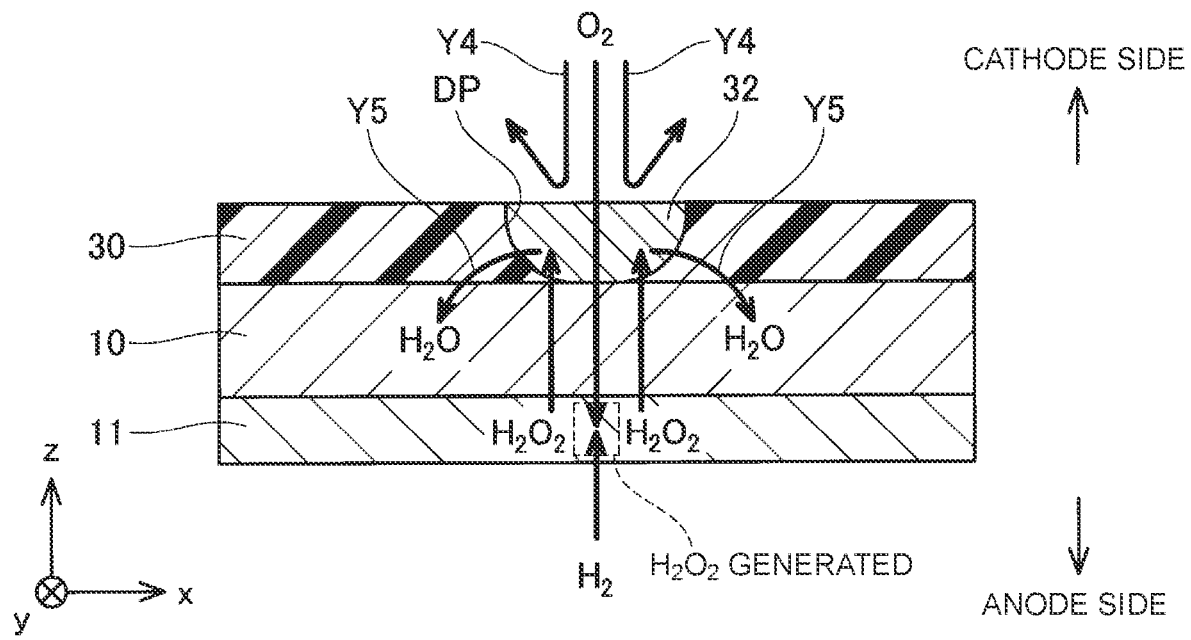
FIG. 8 is an enlarged sectional view of the recessed portion DP where the catalyst ink 32 is placed.

In step S4, as illustrated in FIG. 6, the support frame 31 is provided on the adhesive layer 30 in a contact manner. Then, the support frame 31 is bonded by pressure to the adhesive layer 30 by press plates 61, 62 corresponding to the support frame 31 (FIG. 8). Hereby, the adhesive layer 30 is pushed out, so that the adhesive layer 30 moves inwardly on the electrolyte membrane 10 (see an arrow Y1). The adhesive layer 30 thus moving gathers to swell inside the specific region SA. Further, along with the movement of the adhesive layer 30, the air bubbles B1 also move into the specific region SA. Since the air bubbles B1 dispersed in the inner peripheral region IA gather in the specific region SA, the air-bubble density inside the specific region SA increases. The air bubbles B1 thus gathering are combined to each other, so that the air-bubble size becomes large. As a result, the recessed portion DP penetrating through the adhesive layer 30 is formed.

In step S5, the adhesive layer 30 is irradiated with UV via the support frame 31. Hereby, in a state where the recessed portion DP is formed, the adhesive layer 30 cures. In step S6, an inspection step of inspecting whether or not the recessed portion DP is present on the surface of the adhesive layer 30 present inwardly from the inner peripheral edge part E3 of the opening OP (that is, the adhesive layer 30 present within the specific region SA). The inspection step may be performed by use of an inspection apparatus including a camera and an image processor or may be performed by visual inspection.

In step S7, a step of placing the catalyst ink 32 inside the recessed portion DP present on the surface of the adhesive layer 30 present within the specific region SA is performed. More specifically, in the inspection step of step S6, a presence region where the recessed portion DP is present is detected. Then, the catalyst ink 32 is applied to the presence region selectively. Hereby, it is possible to reduce the used amount of the catalyst ink 32 or to shorten the application time to apply the catalyst ink 32. After that, while a member such as a scraper or a cloth is pressed against the surface of the adhesive layer 30 to which the catalyst ink 32 is applied, the member is moved. Hereby, the catalyst ink 32 can be filled into the recessed portion DP.

Note that, in a case where it has been determined in the inspection step of step S6 that the recessed portion DP is not present, step S7 may be omitted.

In step S8, the cathode MPL 22m and the cathode-gas diffusion layer 22 are placed on the cathode catalyst layer 12. More specifically, the cathode-gas diffusion layer 22 where the cathode MPL 22m is formed is subjected to pressure bonding by press plates (not illustrated). Hereby, the MEGA sheet 1 illustrated in FIG. 3 is completed.

Effects

Figure 7:
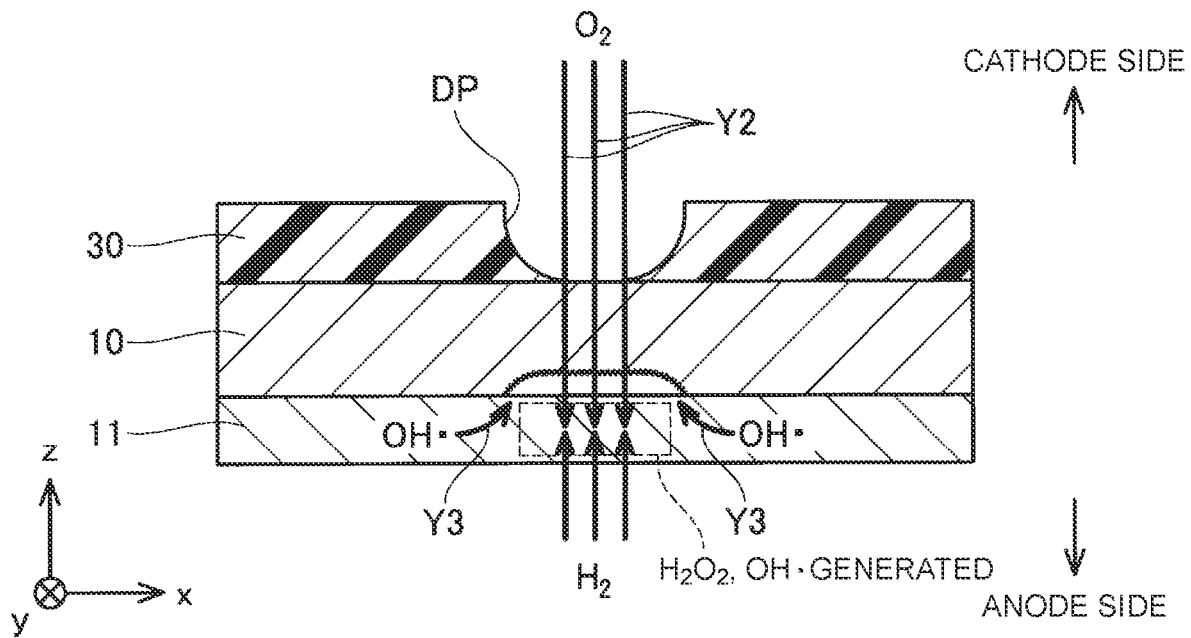
FIG. 7 is an enlarged sectional view of a recessed portion DP in which a catalyst ink 32 is not placed.

Next will be described problems with reference to a comparative example in FIG. 7. FIG. 7 is an enlarged sectional view of the recessed portion DP in which no catalyst ink 32 is placed. The cathode-gas diffusion layer 22, the anode MPL 21m, and the anode-gas diffusion layer 21 are not illustrated. Oxygen on the cathode side crosses over to the anode side via the recessed portion DP penetrating through the adhesive layer 30 (arrows Y2). As a result, a reaction expressed by Formula (1) occurs on the anode side where the potential is low, so that hydrogen peroxide is generated.

$$O_2 + 2H^+ + 2e^- \rightarrow H_2O_2 \qquad \text{Formula (1)}$$

Further, in a case where Fe ions are contained in the MEA 13, the Fe ions react with hydrogen peroxide, so that hydroxyl radicals are generated as expressed by Formula (2).

$$Fe^{2+}+H_2O_2+H^+ \rightarrow Fe^{3+}+OH\cdot+H_2O \qquad \text{Formula (2)}$$

The hydroxyl radicals decompose the electrolyte membrane 10, so that the electrolyte membrane 10 is reduced in thickness due to chemical deterioration (arrows Y3). In the worst case, cross leakage occurs.

In the inner peripheral region IA (see FIG. 3), the support frame 31 is placed on the surface 10c on the cathode side of the electrolyte membrane 10. Accordingly, even in a case where the recessed portion DP is present, the support frame 31 serves as a shield, so that crossover of oxygen does not occur. Further, in a region where the cathode catalyst layer 12 is placed, hydrogen peroxide spreading to the cathode catalyst layer 12 can be decomposed by platinum in the cathode catalyst layer 12. This can be expressed by Formula (3).

$$H_2O_2+2H^++2e^- \rightarrow 2H_2O \qquad \text{Formula (3)}$$

Accordingly, in the region where the cathode catalyst layer 12 is placed, chemical deterioration of the electrolyte membrane 10 is restrained. However, in the specific region SA, the support frame 31 and the cathode catalyst layer 12 are not present, so that chemical deterioration of the electrolyte membrane 10 easily occurs.

With reference to FIG. 8, the following describes effects of the technology of the present embodiment. FIG. 8 is a sectional view similar to FIG. 7. In the technology of the present embodiment, the catalyst ink 32 is placed inside the recessed portion DP formed in the adhesive layer 30 within the specific region SA. Due to the catalyst ink 32 filled in the recessed portion DP, at least part of crossover of oxygen can be blocked (arrows Y4). Further, even in a case where hydrogen peroxide is generated in the anode catalyst layer 11, hydrogen peroxide spreading to the recessed portion DP can be decomposed by platinum contained in the catalyst ink 32 (arrows Y5). Hereby, the generation of hydrogen peroxide that causes chemical deterioration of the electrolyte membrane 10 can be reduced. Even in the specific region SA, it is possible to restrain chemical deterioration of the electrolyte membrane 10.

Figure 9:
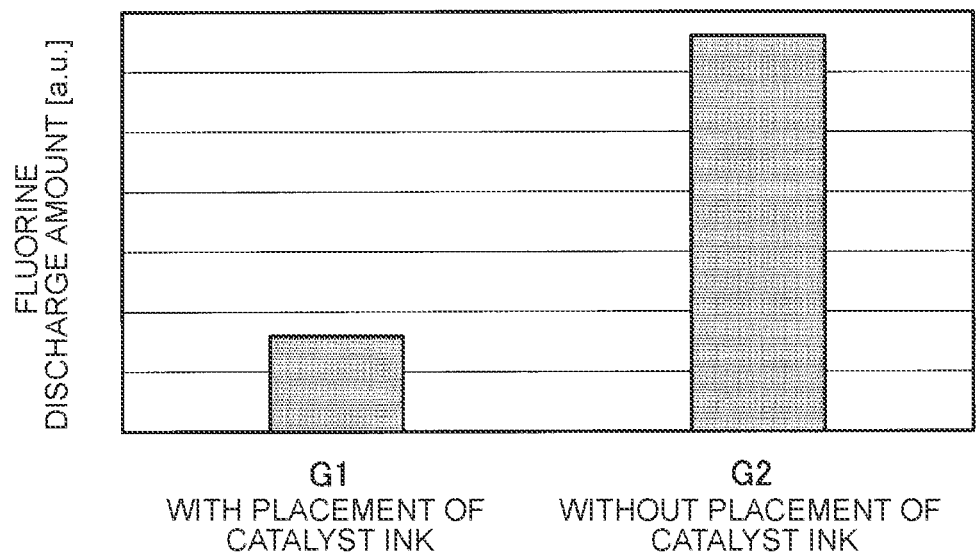
FIG. 9 is comparison graphs to compare fluorine discharge amounts.

FIG. 9 illustrates comparison graphs to compare fluorine discharge amounts. The vertical axis indicates an accumulation value of the fluorine discharge amount within a predetermined time and is an arbitrary unit. A graph G1 is a discharge amount in a case where the catalyst ink 32 is placed insider the recessed portion DP. A graph G2 is a discharge amount in a case where the catalyst ink 32 is not placed inside the recessed portion DP as a comparative example. When hydroxyl radicals decompose the electrolyte membrane 10, fluorine is discharged. Accordingly, the graphs exhibit that, as the fluorine discharge amount is smaller, chemical deterioration of the electrolyte membrane 10 can be restrained more. As illustrated in FIG. 9, it is found that, with the use of the technology of the present embodiment, the fluorine discharge amount can be reduced to be equal to or less than ¼ of that of the comparative example.

Embodiment 2

In Embodiment 1, the catalyst ink 32 is placed inside the recessed portion DP (see FIG. 3). Embodiment 2 describes a mode in which the MPL paste is placed inside the recessed portion DP. As described above, the MPL paste is a material to form the anode MPL 21m and the cathode MPL 22m. The MPL paste contains cerium oxide. Since the MPL paste is also used as a material to fill the recessed portion DP, it is not necessary to separately prepare a special material to fill the recessed portion DP. Since a material cost can be restrained, it is possible to reduce the manufacturing cost of the MEGA sheet 1. Note that a basic structure or a manufacturing method in Embodiment 2 are similar to those in Embodiment 1, so detailed descriptions thereof are omitted herein.

Effects

Figure 10:
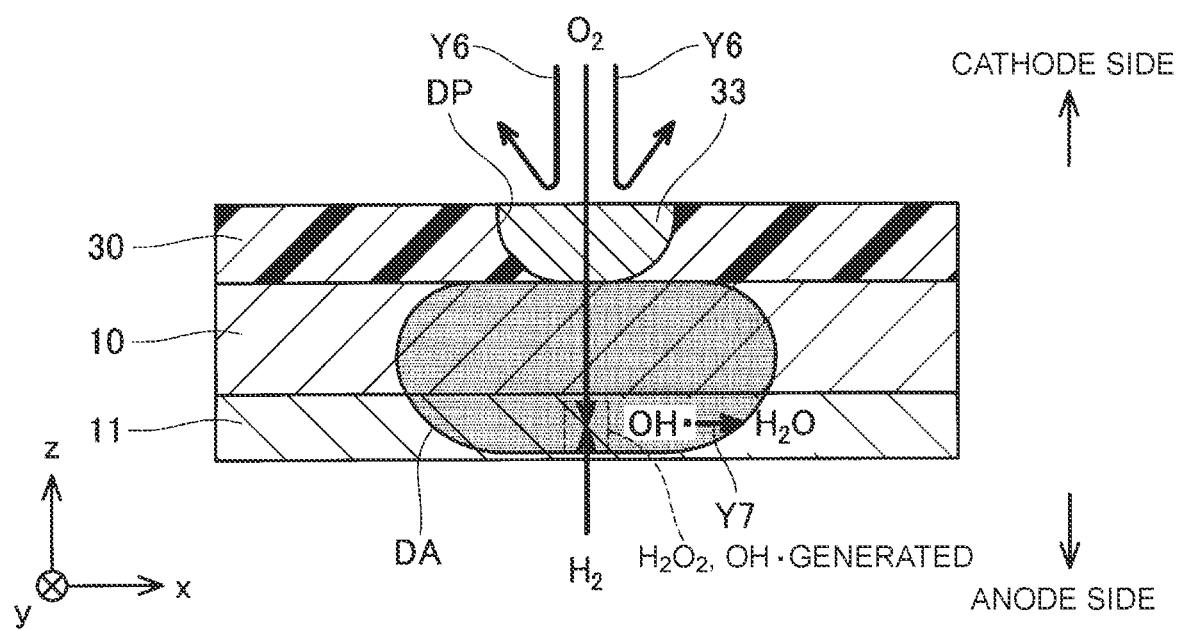
FIG. 10 is a view to describe a technical effect of Embodiment 2.

With reference to FIG. 10, the following describes effects of the technology of Embodiment 2. FIG. 10 is a sectional view similar to FIG. 8. In the technology of Embodiment 2, MPL paste 33 is placed inside the recessed portion DP formed in the adhesive layer 30 within the specific region SA. Due to the MPL paste 33 filled in the recessed portion DP, at least part of crossover of oxygen can be blocked (arrows Y6).

Further, cerium ions ($Ce^{3+}$) elute from the MPL paste 33 and diffuse in the electrolyte membrane 10 and the anode catalyst layer 11. A diffusion region DA in which cerium ions are diffused can be formed around the recessed portion DP (FIG. 10, a region illustrated in gray). In the diffusion region DA, hydroxyl radicals can be decomposed by cerium ions as expressed by Formula (4) (an arrow Y7).

$$Ce^{3+}+OH\cdot+H^+ \rightarrow Ce^{4+}+H_2O \qquad \text{Formula (4)}$$

This makes it possible to restrain chemical deterioration of the electrolyte membrane 10.

Note that, as expressed by Formula (4), a tetravalent cerium ion is generated after a reaction with a hydroxyl radical. However, this tetravalent ion returns to a trivalent ion due to the potential of a fuel cell. Accordingly, a hydroxyl-radical decomposition action by cerium ions is permanent. Further, even in a case where cerium ions are removed by discharged water from the MEA 13, new cerium ions can be supplied from the MPL paste 33. Accordingly, the diffusion region DA can be maintained permanently.

The embodiments have been described above in detail, but the embodiments are only examples and do not limit the scope of Claims. The technology described in the scope of Claims includes the foregoing concrete examples with various modifications and changes. Each of or various combinations of the technical elements described in the present specification or the drawings achieve a technical usefulness, and the technical elements are not limited to the combination stated in the claims at the time of filing. Further, the technology described in the present specification or the drawings can achieve a plurality of objects at the same time and has a technical usability by achieving one of those objects.

Modifications

The material to be placed inside the recessed portion DP may contain both a substance having an action of decomposing hydrogen peroxide and a substance having an action of decomposing hydroxyl radicals. For example, a material containing both platinum and cerium may be used.

The substance having an action of decomposing hydroxyl radicals is not limited to cerium and may be any various substances. For example, the substance may be silver.

The inspection step of step S6 may be omitted. In this case, in step S7, the catalyst ink 32 should be applied to the whole adhesive layer 30 present within the specific region SA.

The anode catalyst layer 11 is one example of a first catalyst layer. The anode-gas diffusion layer 21 is one example of a first gas diffusion layer. The cathode catalyst layer 12 is one example of a second catalyst layer. The cathode-gas diffusion layer 22 is one example of a second gas diffusion layer. The catalyst ink 32 and the MPL paste 33 are examples of a predetermined material.

What is claimed is:

1. A fuel cell comprising:
an electrolyte membrane;
first and second catalyst layers;
first and second gas diffusion layers;
an adhesive layer; and
a support frame, wherein:
the first catalyst layer is placed on a first surface of the electrolyte membrane;
the first gas diffusion layer is placed on the first catalyst layer;
the second catalyst layer smaller than the electrolyte membrane is placed on a second surface of the electrolyte membrane such that the second catalyst layer is placed inwardly from an outer periphery of the electrolyte membrane;
the second gas diffusion layer smaller than the electrolyte membrane is placed on the second catalyst layer such that the second gas diffusion layer is placed inwardly from the outer periphery of the electrolyte membrane;
the adhesive layer is placed in a region outside an outer peripheral edge part of the second catalyst layer, on the second surface of the electrolyte membrane;
the support frame includes an opening larger than the second catalyst layer and the second gas diffusion layer;
the support frame is disposed on the second surface of the electrolyte membrane via the adhesive layer such that the second catalyst layer and the second gas diffusion layer are placed inside the opening;
a specific region as a region between the outer peripheral edge part of the second catalyst layer and an inner peripheral edge part of the opening of the support frame is present; and
a predetermined material is placed inside a recessed portion present on a surface of the adhesive layer within the specific region, the predetermined material containing at least one of a first substance having an action of decomposing hydrogen peroxide and a second substance having an action of decomposing hydroxyl radicals.

2. The fuel cell according to claim 1, wherein the first substance is platinum.

3. The fuel cell according to claim 1, wherein the second substance is cerium or silver.

4. The fuel cell according to claim 1, wherein:
the second catalyst layer contains the first substance; and
the predetermined material is the same as a material forming the second catalyst layer.

5. The fuel cell according to claim 1, further comprising a porous layer placed between the second catalyst layer and the second gas diffusion layer, the porous layer containing water-repellent resin and the second substance, wherein the predetermined material is the same as a material forming the porous layer.

* * * * *